US009503944B2

United States Patent
Centonza et al.

(10) Patent No.: US 9,503,944 B2
(45) Date of Patent: *Nov. 22, 2016

(54) METHODS AND APPARATUS FOR DETECTING POSSIBLE REPEATED HANDOVER DIFFERENT RADIO ACCESS TECHNOLOGIES

(71) Applicant: TELEFONAKTIEBOLAGET L M ERICSSON (PUBL), Stockholm (SE)

(72) Inventors: Angelo Centonza, Winchester (GB); Fredrik Gunnarsson, Linkoping (SE); Kristina Zetterberg, Linkoping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/691,737

(22) Filed: Apr. 21, 2015

(65) Prior Publication Data

US 2015/0304907 A1 Oct. 22, 2015

Related U.S. Application Data

(63) Continuation of application No. 13/810,283, filed as application No. PCT/EP2012/075227 on Dec. 12, 2012, now Pat. No. 9,042,895.

(60) Provisional application No. 61/679,225, filed on Aug. 3, 2012, provisional application No. 61/605,811, filed on Mar. 2, 2012.

(51) Int. Cl.
*H04W 36/00* (2009.01)
*H04W 36/24* (2009.01)

(52) U.S. Cl.
CPC ..... *H04W 36/0066* (2013.01); *H04W 36/0022* (2013.01); *H04W 36/245* (2013.01)

(58) Field of Classification Search
CPC H04W 36/0083; H04W 24/10; H04W 36/00
USPC ............... 455/436, 438, 435.1, 437, 444; 370/311, 332, 252, 328, 331, 221, 228
See application file for complete search history.

(56) References Cited

U.S. PATENT DOCUMENTS

| 8,285,289 | B2 * | 10/2012 | Mooney | ............ H04W 36/0016 370/331 |
| 2008/0020770 | A1 * | 1/2008 | Hofmann | ............ H04W 36/30 455/438 |

(Continued)

OTHER PUBLICATIONS

Alcatel-Lucent. Finalization of too Early Handovers by UE Measurements. 3GPP TSG RAN WG3 Meeting #66bis. R3-100384. Valencia, Spain. Jan. 18-22, 2010.

(Continued)

*Primary Examiner* — Kiet Doan

(57) ABSTRACT

Inter-radio access technology (IRAT) ping pong handover of a user equipment (UE) connection between a source radio access technology (RAT) communications network, e.g., LTE, and a different target RAT communications network, e.g., UTRAN, is detected. A control node determines IRAT ping pong handover information and evaluates an IRAT handover request message for the UE connection from the source RAT network with respect to the handover ping pong information. Based thereon, the node determines that the UE connection meets one or more ping pong conditions associated with the handover ping pong information and provides an indication of an IRAT ping pong handover condition to a base station in the source RAT network to allow the base station to make mobility adjustments.

37 Claims, 11 Drawing Sheets

(56) References Cited

U.S. PATENT DOCUMENTS

| | | | |
|---|---|---|---|
| 2009/0104909 | A1 | 4/2009 | Vesely et al. |
| 2009/0111468 | A1* | 4/2009 | Burgess ............... H04W 36/14 455/436 |
| 2010/0173626 | A1 | 7/2010 | Catovic et al. |
| 2010/0234026 | A1* | 9/2010 | Tenny ............... H04W 36/0061 455/436 |
| 2010/0317349 | A1* | 12/2010 | Serravalle ............. H04W 60/00 455/440 |
| 2011/0263255 | A1 | 10/2011 | Alonso-Rubio et al. |

OTHER PUBLICATIONS

3GPP TS 23.401 v10.7.0 (Mar. 2012), pp. 1-278.
3GPP TS 25.413 v10.5.0 (Mar. 2012), pp. 1-21.
3GPP TS 36.413 v10.5.0 (Mar. 2012), pp. 1-256.
3GPP TS 48.018 v8.8.0 (Mar. 2012), pp. 1-172.
3GPP TSG-RAN WG3 Meeting #75, The way forward for inter-RAT ping-pong, R3-120400, Feb. 6-10, 2012.
International Search Report mailed May 2, 2013 in International Application No. PCT/EP2012/075227 Nokia Siemens Networks: "Ping-Pong Detection and Correction in SON Framework", 3GPP Draft; R3-120279; Jan. 30, 2012; XP050566545, pp. 1-3.
New Postcom: "Discussions on Short Stay Report", 3GPP Draft; R3-112919 Discussions on Short Stay Report; Nov. 5, 2011, XP050566234, pp. 1-2.
Nokia Siemens Networks: "Problem Description and Proposal of a Solution for Short Stay Detection", 3GPP Draft; R3-113010 NSN MRO SS-PP, Nov. 4, 2011, XP050566152, pp. 1-3.

* cited by examiner

| IE/Group Name | Presence | Range | IE type and reference | Semantics description |
|---|---|---|---|---|
| RSRP | O | | INTEGER (0..97) | Threshold of RSRP |
| RSRQ | O | | INTEGER (0..34) | Threshold of RSRQ |
| IRAT Measurement Parameters | M | | | |
| >Measurement Duration | M | | INTEGER (1..100) | The period of time following the successful IRAT handover, during which the target RAT instructs the UE to measure cells of the source RAT. Unit: [second] |
| >E-UTRA frequencies | | 0 to <maxnoofEUTRAFreqs> | | If present, designates the specific E-UTRAN frequencies which the target RAT may instruct the UE to measure. |
| >>E-ARFCN | M | | INTEGER (0..65535) | EARFCN of the downlink carrier frequency TS 36.101 [58]. |
| >>Measurement Bandwidth | O | | ENUMERATED(6, 15,25,50,75,100) | Measurement bandwidth of the carrier frequency as defined in TS 25.331 [10]. |

Figure 4

| IE/Group Name | Presence | Range | IE type and reference | Semantics description |
|---|---|---|---|---|
| HO Type | M | | ENUMERATED (LTE to UTRAN, LTE to GERAN, ...) | |
| HO Report Type | M | | ENUMERATED (Unnecessary HO to another RAT, ...) | |
| HO Source ID | M | | IRAT Cell ID B.1.8 | Contains the cell ID of the source cell for the HO. This IE shall contain an E-UTRAN CGI, and shall be set to the same value as the *Reporting Cell Identifier* IE in TS 48.018 [18] |
| HO Target ID | M | | IRAT Cell ID B.1.8 | Contains the cell ID of the target cell for the HO. This IE shall contain either a UTRAN Cell ID or a GERAN Cell ID. |
| Candidate Cell List | | 1 to <maxNrOfCandidateCells> | | |
| >Candidate Cell ID | M | | IRAT Cell ID B.1.8 | This IE shall contain an E-UTRAN CGI. |

Figure 5

| IE/Group Name | Presence | Range | IE type and reference | Semantics description |
|---|---|---|---|---|
| HO Type | M | | ENUMERATED (LTE to UTRAN, LTE to GERAN, ....) | |
| HO Report Type | M | | ENUMERATED (Unnecessary HO to another RAT, ..., Early IRAT Handover) | |
| HO Source ID | M | | IRAT Cell ID B.1.8 | Contains the cell ID of the source cell for the HO. This IE shall contain an E-UTRAN CGI, and shall be set to the same value as the *Reporting Cell Identifier* IE in TS 48.018 [18] |
| HO Target ID | M | | IRAT Cell ID B.1.8 | Contains the cell ID of the target cell for the HO. This IE shall contain either a UTRAN Cell ID or a GERAN Cell ID. |
| Candidate Cell List | | 1 to <maxNrOfCandidateCells> | | |
| >Candidate Cell ID | M | | IRAT Cell ID B.1.8 | This IE shall contain an E-UTRAN CGI. |

Figure 8

METHODS AND APPARATUS FOR DETECTING POSSIBLE REPEATED HANDOVER DIFFERENT RADIO ACCESS TECHNOLOGIES

RELATED APPLICATIONS

This application is Continuation of pending U.S. application Ser. No. 13/810,283 filed Jan. 15, 2013, which was a national phase of International Application No. PCT/EP2012/075227 filed Dec. 12, 2012, which designated the U.S. and claims priority to U.S. Provisional Application No. 61/605,811 filed Mar. 2, 2012, and U.S. Provisional Application No. 61/679,225 filed Aug. 3, 2012, the entire contents of each of which are hereby incorporated by reference.

TECHNICAL FIELD

This technology relates to radio communications involving different radio access technologies (RATs).

INTRODUCTION

As shown in FIG. 1, the Long Term Evolution (LTE) and GSM EDGE Radio Access Network/Universal Terrestrial Radio Access Network (GERAN/UTRAN) architectures communicate via interfaces between core network nodes of each respective technology. See 3GPP TS 23.401, the contents of which are incorporated herein by reference. One of the ways for the LTE and GERAN/UTRAN technologies to communicate with each other is via the Radio Information Management (RIM) protocol, which allows transfer of information from LTE to GERAN/UTRAN in a pre-configured manner, as specified in 3GPP TS 48.018, the contents of which are incorporated herein by reference. A specific type of RIM interaction is defined to avoid unnecessary handovers from LTE to GERAN/UTRAN networks. Unnecessary handovers are often referred to as ping pong handovers. Herein, a handover or a UE handover refers to handover of a UE connection.

FIG. 2 shows an example of handover (HO) ping pong between a first radio access network (RAN) base station using a first type of radio access technology (RAT) referred to as RAT 1 and a second RAN base station using a second different type of radio access technology (RAT) referred to as RAT 2. Each of the base stations is associated with a respective core network node. Depending on the type of radio access network (RAN) which characterizes the base stations, the core network nodes can be or comprise, for example, a Serving GPRS Support Node (SGSN) node for a UTRAN network or a Mobility Management Entity (MME) for an E-UTRAN or LTE type of network. One or both/more core network nodes comprise a handover ping pong detector and a UE context memory 44. The handover ping pong detector determines whether a UE connection is in a handover ping pong scenario. The handover ping pong detector ascertains whether the UE is in a handover ping pong scenario by using history information concerning the UE, and particularly history information, which comprises a list L representing handover events that occurred in the past for wireless terminal 30. The history list L is maintained and updated as appropriate by the network core networks which serve the base stations to which the UE travels. In this example, FIG. 2 shows list L being transferred from one core network node to another core network node in conjunction with a most recent handover of the UE culminating in storage of list L in UE context memory.

FIG. 3 shows a message sequence chart for an Unnecessary IRAT Handover procedure currently included in 3GPP TS 48.018, TS 36.413, and TS 25.413, all of which are incorporated herein by reference.

The LTE radio access network (RAN) configures specific measurement criteria and thresholds for handing over a UE connection from LTE, (i.e., an LTE base station is referred to as an eNB), to a Radio Network Controller (RNC) coupled to a NB2 in cell 2 in GERAN/UTRAN, (a GERAN/UTRAN base station is referred to as a NodeB or NB). The measurement configuration is provided in the following message named the IRAT Measurement Configuration IE in 3GPP TS.25.413.

The configuration in FIG. 4 is sent by an LTE node to a UTRAN/GERAN node via the Source BSS to Target BSS Transparent Container IE (in a case of handover to GERAN, see TS 48.018) or via the Source RNC to Target RNC Transparent Container IE (in case of handover to UTRAN, see TS 25.413) within the handover signalling, i.e., as part of the HANDOVER REQUIRED message generated in LTE (as shown in step 1 and step 2 of FIG. 1a). Upon reception of this configuration, the UTRAN/GERAN needs to configure the UE handed over from LTE to perform UE measurements for a time duration equal to the Measurement Duration IE and over the E-UTRAN frequencies indicated in the E-UTRA frequencies IE. The LTE cells for which UE measurements are taken are sent to and recorded by the target UTRAN/GERAN base station if the measurement results are above preconfigured thresholds specified in the RSRP IE and RSRQ IE. If the measurements performed by the UE fulfill the configured thresholds for the whole measurement duration, then the RNC will trigger an unnecessary IRAT handover indication by means of delivery of an HO REPORT message from GERAN/UTRAN to E-UTRAN (see step 5 of FIG. 1a) if the following is satisfied (excerpted from TS 25.413):

> The cells for which all UE measurements received during the indicated period of time exceeded the threshold if any. In case there is no source RAT cell whose measurement results exceed the threshold for the whole measurement duration, but a group of source RAT cells together provide coverage that fulfils the threshold during the whole measurement period, HO Report should also be triggered, in which the cells that exceed the threshold in the first UE measurement report are included. If both thresholds are present, the received radio measurements must exceed both the RSRP and the RSRQ thresholds in order to satisfy the indicated radio conditions.

As it can be seen from the quote above, the HO Report IE will be generated only if reported measurements satisfy the configured thresholds for the whole duration of the configured measurement window. If all the conditions are satisfied, then the HO Report IE sent from UTRAN/GERAN to LTE via RIM is constructed as follows (see TS 36.413):

In the HO Report IE, the Cells reported in the Candidate Cell List IE are the LTE cells providing good enough coverage, while the HO Target ID IE is the cell towards which handover can be avoided while in LTE.

A new scenario must be addressed as part of the Self Organizing Network (SON) Enhancements Work Item Description (WID). This scenario is described as follows in R3-120400: "In inter RAT mobility, a ping pong HO is understood as a handover from a source cell in a source RAT (A) to a target cell in a target RAT (B) different from the source RAT, and where the UE is being handed over back to a cell in the source RAT (A) within a 'definable limited time.' Additionally, the case when the stay at the target RAT is still within the 'definable limited time,' but the UE passes through more than one cell before handing over to the source RAT, should also be considered as an inter-RAT ping-pong."

The scenario above can be readily detected if the UE hands over from UTRAN/GERAN to LTE and back to UTRAN/GERAN because the assumption by RAN3 for ping pong detection is that the ping pong event is detected only if the UE comes back to a cell in the same radio network controller/base station subsystem (RNC/BSS) domain.

During a ping pong handover scenario of type UTRAN/GERAN—LTE—UTRAN/GERAN, the UE History Information IE will be sent in a transparent container from LTE to the final target UTRAN/GERAN RNC/BSS as part of the handover signaling. From this IE, the target UTRAN/GERAN RNC/BSS can deduce that the UE moved from UTRAN/GERAN to LTE and back to UTRAN/GERAN. Hence, the UTRAN/GERAN Radio Network System (RNS) can adjust mobility configuration parameters towards the specific LTE cell involved in the ping pong event and prevent a similar ping pong event from reoccurring.

But in the case of ping pong from LTE to GERAN/UTRAN and back to LTE, the ping pong effect is not avoided using an UE History Information IE or using LTE RNS internal analysis. Consider the example in FIG. 6 which shows a UE affected by a E-UTRAN→UTRAN→E-UTRAN handover ping pong. FIG. 6 also introduces cells. A cell corresponds to an area served by a base station at a specific carrier frequency using a specific radio access technology (RAT). The base station 1 serves cell1 in this example using E-UTRAN RAT, and therefore, the base station is denoted as an eNB1. The base station 2 serves cell2 in the example using UTRAN RAT, and therefore, the base station is denoted NB2. The NB2 is controlled by a radio network controller (RNC) denoted as RNC2. The base station 3 serves cell3 in the example using E-UTRAN RAT, and therefore, the base station is denoted eNB3). Handover of a UE connection is referred to as between cells, although it is understood that nodes serve and control cells and are responsible for handover functions and signaling. Here, the UE may handover to a Cell3 served by the eNB3 from the source Cell1 where the ping pong mobility was initiated. In this case, it is not possible to deduce at the source eNB (eNB1) that the ping pong occurred neither the UE History Information IE reach the source eNB1, nor eNB1 knows whether the ping pong event is avoidable or not. The problem is therefore how to ensure efficient detection and resolution of the ping pong effect described in this scenario.

In R3-120400, a brief description of possible solutions to this problem was presented. However, those solutions are based on the definition of either a new X2 procedure or modification of an existing procedure, and thus, are not efficient due to their high impact on existing eNBs and interfaces. A simpler more efficient solution is therefore desirable.

SUMMARY

Methods and apparatus are described for detecting a possible inter-radio access technology (IRAT) ping pong handover of a user equipment (UE) connection between a source radio access technology (RAT) communications network and a different target RAT communications network. In an IRAT ping pong handover, the UE connection is handed over from a first cell in the source RAT network to a second cell in the target RAT network and then handed over back to a third cell in the source RAT network within a predetermined limited time during which coverage for the UE connection is available from the source RAT network. A control node associated with the target RAT network may be configured to perform the following: determining IRAT ping pong handover information, evaluating the UE connection related to an IRAT handover request message from the source RAT network with respect to the IRAT ping pong handover information, based on the evaluating, determining that the UE connection meets one or more ping pong conditions associated with the IRAT ping pong handover information, and providing an indication of an IRAT ping pong handover condition to a base station in the source RAT network.

The IRAT ping pong handover may involve different base stations in the source RAT network, in which case, the control node provides the indication of the IRAT ping pong handover condition to a handover source base station in the source RAT network.

In some example embodiments, the determining step includes receiving the IRAT handover request message from a source base station in the source RAT network that includes IRAT measurement configuration information, UE handover measurement time period information, and IRAT handover time period information. The determining step further includes determining that the UE connection is to be handed back over to the source RAT network before the UE handover measurement time period has expired and before the IRAT handover time period has expired. In an example application, the source RAT network is an LTE network, the target RAT communications network is a UTRAN network, the control node is a Radio Network Controller (RNC). The RNC receives from the first cell a handover required/relocation request message that includes the IRAT measurement configuration information, the UE handover measurement time period information, and the IRAT handover time period information, and sends a Radio Information Management (RIM) Request transfer message to the first cell that includes a handover report having a IRAT ping pong handover information element. The RNC may send the RIM message independently of whether an IRAT handover ping pong of the UE connection occurs. The RNC may also send the handover report to a base station serving the first cell to allow that base station to adjust mobility or handover settings associated with the second cell and/or target RAT network to avoid a future hand over of the UE connection to the second cell. The handover report may include a HO Report Type information element (IE) or a HO type IE that includes an IRAT ping pong handover indicator.

In another example embodiment, the control node adjusts handover or mobility parameters associated with the third cell and/or with the source RAT network, which are used to configure UE measurements and report triggering.

In another example embodiment, the IRAT ping pong handover indication is sent from a base station serving the third cell to a base station serving the first cell.

In some example embodiments where the IRAT ping pong handover involves different base stations in the source RAT network, the control node provides the indication of the IRAT ping pong handover condition to a handover target base station in the source RAT network for subsequent delivery to a handover source base station in the source RAT network to allow the handover source base station to adjust mobility or handover settings associated with the second cell and/or the target RAT network to avoid a future hand over of the UE connection to the second cell.

In an example implementation, the source RAT network is an LTE network, the target RAT communications network is a UTRAN network, and the control node is a Radio Network Controller (RNC). The RNC sends to the third cell a relocation request acknowledgement/handover message that includes the IRAT ping pong handover indication in a target to source transparent container information element (IE) to allow the third cell to provide the IRAT ping pong handover indication to the first cell.

In another example implementation, where the source RAT network is an LTE network, the target RAT communications network is a UTRAN network, and the control node is a Radio Network Controller (RNC), the RNC receives from a base station serving the first cell a handover required/relocation request message that includes an IRAT ping pong trigger information element (IE) and an IRAT ping pong timer IE in a source to target transparent container.

In some example embodiments, the control node includes an IRAT ping pong timer. The control node determines that the UE connection is handed over from the first cell in the source RAT network to the second cell in the target RAT network and determines an IRAT ping pong occurrence if a handover of the UE connection occurs to the source RAT network before the IRAT ping pong timer expires and coverage for the UE connection is available from the source RAT network. In an example implementation where the source RAT network is an LTE network, the target RAT communications network is a UTRAN network, and the control node is a Radio Network Controller (RNC), the RNC sends an IRAT ping pong indication to the third cell via a target to source transparent container to allow a base station serving the third cell to send an IRAT ping pong indication message to the first cell. In an alternative example implementation, the RNC sends a RELOCATION REQUEST ACKNOWLEDGEMENT message to a core network (CN) node and sending an IRAT ping pong indication to the first cell via a Radio Information Management (RIM) Request Transfer message.

In some example embodiments, the control node receives an IRAT ping pong handover detection time window from an operations and maintenance node.

Another example embodiments provide methods and apparatus for detecting a possible inter-radio access technology (IRAT) ping pong handover of a user equipment (UE) connection between a source radio access technology (RAT) communications network and a different target RAT communications network. A base station associated with the first cell in the source RAT network sends a handover or cell relocation request message to a control node associated with the target RAT communications network, receives an indication of an IRAT ping pong handover condition if the UE connection meets one or more ping pong conditions associated with the handover ping pong information, and adjusts mobility parameters with respect to the second cell and/or to the target RAT network to avoid a future handover of the UE connection to the second cell.

In an example implementation where the source RAT network is an LTE network, the target RAT communications network is a UTRAN network, and the control node is a Radio Network Controller (RNC), the handover or cell relocation request message includes IRAT measurement configuration information and UE handover measurement time period information. The base station receives a Radio Information Management (RIM) Request transfer message that includes a handover report having an IRAT ping pong handover information element. The handover or cell relocation request message may include IRAT handover time period information. The base station may receive an IRAT ping pong handover indication from a base station serving the third cell. The first and third cells may be the same cell or different cells.

The base station may determine statistical information concerning IRAT ping pong handover over an observation time period and sending the determined statistical information to an operations and maintenance node.

In yet another example embodiment, an operations and maintenance node is configured to communicate with a source radio access technology (RAT) communications network and a different target RAT communications network. The operations and maintenance node includes data processing circuitry configured to:
  receive statistical information determined by one or more control nodes concerning IRAT handover ping pong events during an observation time period;
  determine an IRAT handover ping pong detection time window based on the received statistical information;
  provide the determined IRAT handover ping pong detection time window to enable a network control node to detect an IRAT handover ping pong situation for a user equipment (UE) connection and take action to avoid further IRAT ping pong handover of the UE connection,
  where in an IRAT ping pong handover, the UE connection is handed over from a first cell in the source RAT network to a second cell in the target RAT network and then handed over back to a third cell in the source RAT network within a predetermined limited time.

BRIEF DESCRIPTION OF THE FIGURES

FIG. 4 illustrates an example configuration of a 3GPP-based IRAT Measurement Configuration information element (IE);

FIG. 5 illustrates an example configuration of a 3GPP-based HO Report IE message;

FIG. 8 illustrates an example configuration of a 3GPP-based HO Report IE message in accordance with a first non-limiting example embodiment;

DESCRIPTION OF NON-LIMITING EXAMPLE EMBODIMENTS

Figure 1:
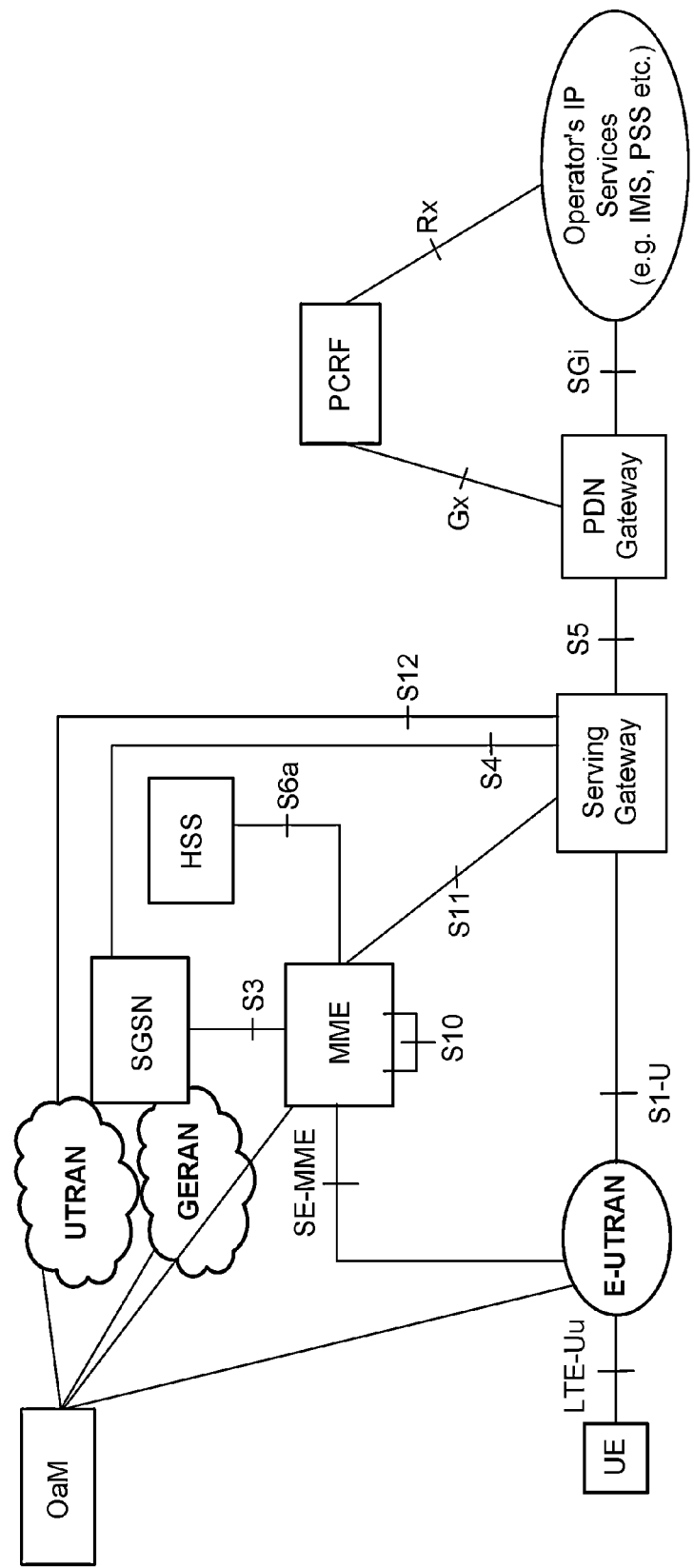
FIG. 1 illustrates in function block form a UTRAN/LTE combined Architecture.
Figure 2:
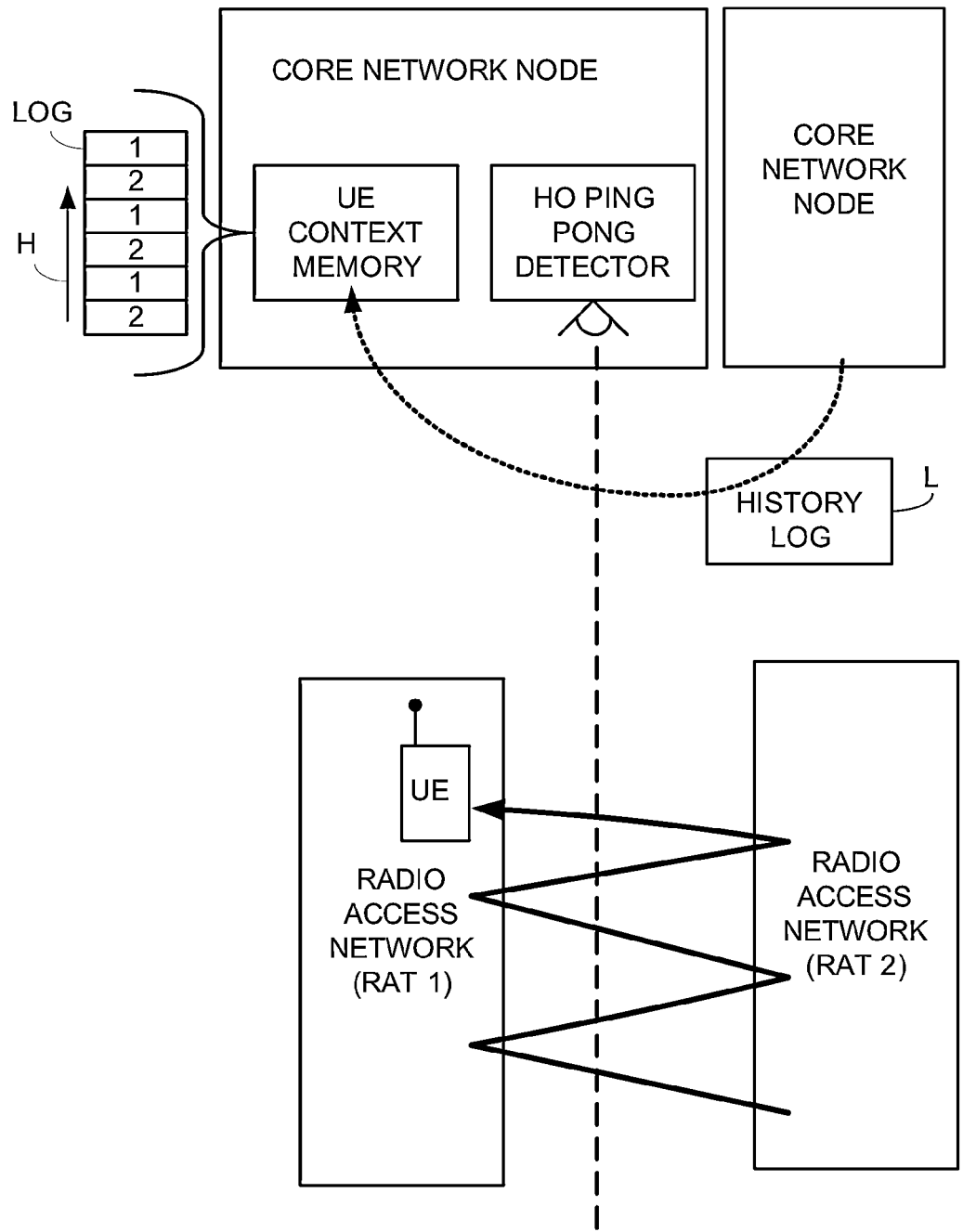
FIG. 2 is a function block diagram illustrating an example of transferring a history log for a UE from one core network node to another core network node.

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

A cell is associated with a base station, where a base station comprises in a general sense any node transmitting radio signals in the downlink (DL) and/or receiving radio signals in the uplink (UL). Example base stations are a NodeB, eNodeB, eNB, macro/micro/pico radio base station, home eNodeB, relay, repeater, sensor, transmitting-only radio nodes or receiving-only radio nodes. A base station may operate or at least perform measurements in one or more frequencies, carrier frequencies or frequency bands and may be capable of carrier aggregation. It is understood that the problem described in the background is not limited to the LTE, UTRAN, and GERAN radio access technologies (RATs). Indeed, the problem may occur among any RATs to which a UE is allowed to handover. Thus, although the description below is in the example context of LTE, UTRAN, and GERAN radio access technologies (RATs), they are only example, and the technology may be applied to other RATs and inter-RAT handover scenarios.

Although the description is given for user equipment (UE), it should be understood by the skilled in the art that "UE" is a non-limiting term comprising any wireless device or node equipped with a radio interface allowing for at least one of: transmitting signals in UL and receiving and/or measuring signals in DL. Some examples of UE in its general sense are a PDA, a laptop, a mobile radio station, a sensor, a fixed relay, a mobile relay, and a radio network node (e.g., an LMU or a femto base station or a small base station using the terminal technology). A UE herein may comprise a UE (in its general sense) capable of operating or at least performing measurements in one or more frequencies, carrier frequencies, component carriers or frequency bands. UEs here can operate using different RATs.

The technology provides methods and apparatus for detecting repeated handover (handover ping pong) of a UE connection between different radio access technologies. A control node associated with a first type of RAT, e.g., an RNC in a UTRAN network, receives or otherwise determines handover ping pong information such as a handover ping pong configuration or one or more handover ping pong criterion. That control node evaluates an incoming UE connection handover from a second different network with a second different type of RAT, e.g., an eNB in a LTE network, with respect to the handover ping pong information to determine if that UE connection meets one or more ping pong conditions associated with the handover ping pong information. If so, the control node provides an indication of a handover ping pong condition to a base station in the second network, e.g., an eNB in the LTE network.

In an example embodiment where the ping pong involves different base stations in the second network, the control node provides the indication of handover ping pong condition to a handover source base station in the second network.

In another example embodiment where the ping pong involves different base stations in the second network, the control node provides the indication of handover ping pong condition to a handover target base station in the second network which then relays that indication of handover ping pong condition to a handover source base station in the second network.

Figure 7A:
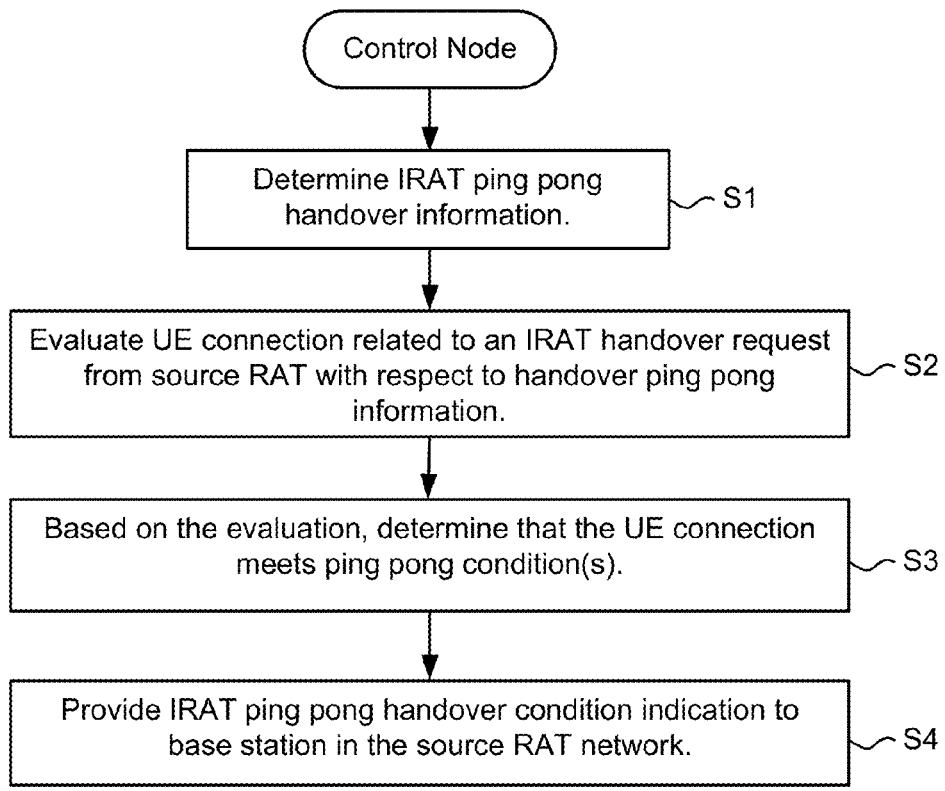
FIGS. 7A and 7B are flowcharts that illustrates non-limiting example procedures for use in detecting a possible IRAT ping pong handover of a UE connection.
Figure 7B:
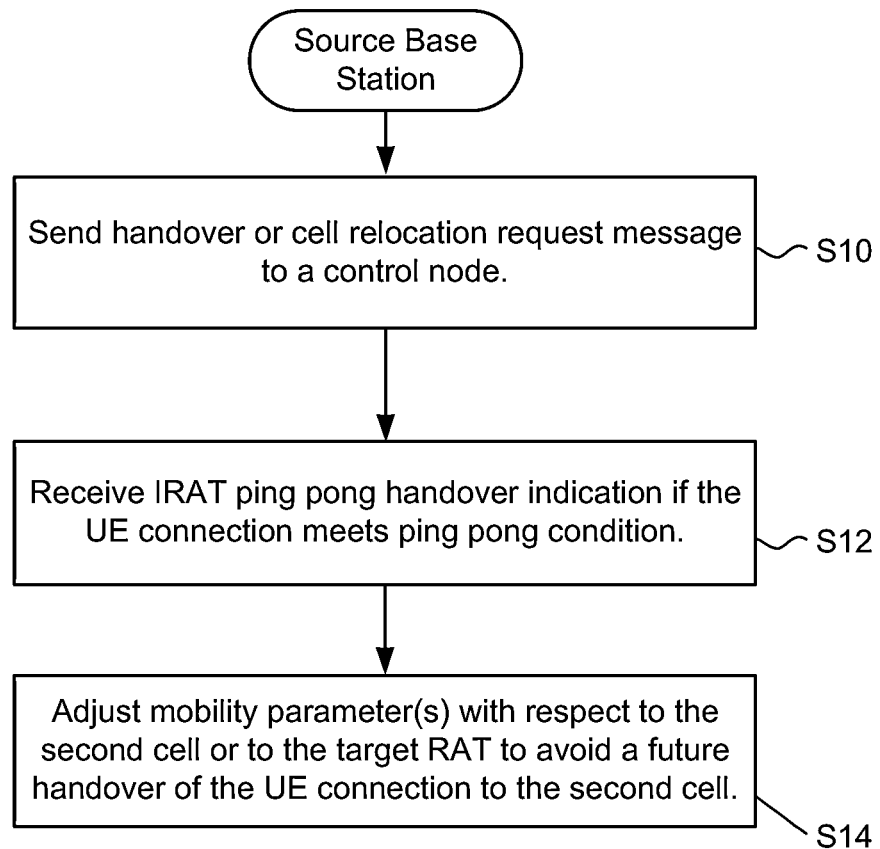

FIGS. 7A and 7B are flowcharts that illustrate non-limiting example procedures for use in detecting a possible IRAT ping pong handover of a UE connection. FIG. 7A illustrates example steps performed at a network control node for detecting a possible inter-radio access technology (IRAT) ping pong handover of a user equipment (UE) connection between a source radio access technology (RAT) communications network and a different target RAT communications network. As explained above, in an IRAT ping pong handover, the UE connection is handed over from a first cell in the source RAT network to a second cell in the target RAT network and then handed over back to a third cell in the source RAT network within a predetermined limited time, even though the UE connection could be served by the source RAT during the time it is being served by the target RAT. The network control node, which is associated with the target RAT network, determines IRAT ping pong handover information (step S1), and evaluates an IRAT handover request message for the UE connection from the source RAT network with respect to the handover ping pong information (step S2). The evaluation may include receiving UE measurements to determine that the UE connection could be served by the source RAT during the time it is being served by the target RAT. Based on the evaluating, the control node determines that the UE connection meets one or more ping pong conditions associated with the handover ping pong information (step S3) and provides an indication of an IRAT ping pong handover condition to a base station in the source RAT network (step S4).

FIG. 7B illustrates example steps performed at the source base station for detecting a possible IRAT ping pong handover of the UE connection. Initially, the source base station sends a handover or cell relocation request message, which may include a Measurement Configuration information element (IE) aimed at configuring IRAT UE measurements for a certain duration, to a control node associated with the target RAT communications network (step S10). One option is that the source base station has received information for the configuration of the Measurement Configuration IE from an Operations and Maintenance node (OaM). The base station subsequently receives an indication of an IRAT ping pong handover condition if the UE connection meets one or more ping pong conditions associated with the handover ping pong information (step S12). The base station may then adjust mobility parameters with respect to the second cell or target RAT network to avoid a future ping pong and unnecessary handover of the UE connection to the second cell (step S14).

A non-limiting example handover ping pong illustration for a UE connection is from LTE to UTRAN/GERAN and back. But again, the technology may be used for other scenarios involving different source or target RATs. The technology can use an inter-RAT (IRAT) unnecessary handover function (or similar function) to flag or otherwise indicate the occurrence of an LTE→UTRAN/GERAN→LTE ping pong handover scenario. In this example scenario, when a UE connection is handed over from LTE to UTRAN/GERAN, and a measurement configuration is sent to the UTRAN/GERAN network for detection of IRAT handovers, two cases can occur. First, UE measurements collected by the UTRAN/GERAN network during the configured measurement duration window can satisfy predetermined unnecessary handover conditions. In this first case, a Radio Information Management (RIM) message containing a HO Report IE (see FIG. 7 described below) is sent back to the LTE network so that future handovers to the same UTRAN/GERAN cell can be avoided. The RIM message is preferably sent independently of whether the UE connection hands over back to UTRAN/GERAN, e.g., independently from whether an IRAT handover ping pong occurs. In the second case, while collecting measurements within UTRAN/GERAN and before expiration of the measurement duration window, the UE connection is handed over back to the LTE network. If the handover back to LTE happens within a short enough time, this event constitutes an IRAT ping pong. Although to date there is no provision for the HO Report IE to be sent to the LTE network, which means that the measurements collected by the UTRAN/GERAN RNS are lost, the technology in this application allows delivery of the HO Report IE back to the LTE network also in this second case described above. Specifically, the LTE cells detected while the UE connection is being handled in UTRAN/GERAN are reported, and the HO Target ID IE is also reported in cases where the UE hands over back to LTE before a measurement duration window expires. The HO Report IE sent in this case may be enhanced with a new IE to indicate the occurrence of IRAT ping pong. Alternatively, a dedicated handover ping pong indication may be sent from UTRAN/GERAN to LTE after the target RAT identifies the handover ping pong event. Further, the handover ping pong indication may be sent via a dedicated X2 message from the target LTE eNB to the source LTE eNB once the UE connection hands over back to LTE.

The triggering of the handover ping pong detection may be performed either immediately or over a time period. Triggering may also be performed on a statistical basis, i.e., in case a pre-set number of handover ping pong instances have occurred or if a pre-set number of instances have occurred in a pre-set time window.

As an example of how to distinguish that an HO Report IE is sent even in cases when the measurement period is interrupted by an handover to LTE, namely to distinguish this case from other cases of unnecessary IRAT handover detection, a new value for the HO Report Type IE or HO type IE may be introduced as shown in FIG. 8. For example, the new value may be named "Early IRAT Handover." The table below shows a HO Report IE, where the new value for the HO Report Type IE is included. The new value may also be included in the HO Type IE (although not shown in this example).

By adding a new value to the HO Report Type IE or to the HO Type IE, the LTE eNB receiving the HO Report IE can determine that the report does not refer to measurements covering the entire measurement duration configured in the IRAT Measurement Configuration IE, but instead, that the report refers to a case where a new inter RAT handover towards LTE occurred within the measurement interval corresponding to the measurement duration and the measurements up to the handover occurrence have fulfilled the thresholds set in the IRAT Measurement Configuration IE.

A handover ping pong event includes at least two IRAT handovers, e.g., between LTE and the same UTRAN/GERAN Radio Network Subsystem (RNS), occurring in a defined window of time. A handover ping pong detection time window referred to in the examples below is called $T_{IRATPingPong}$. With respect to FIG. 6, a window timer $T_{IRATPingPong}$ is started either at the source base station eNB1 in LTE, when a UE handover is triggered towards UTRAN/GERAN, or at the RNC2 in UTRAN/GERAN, when a UE handover is completed from LTE. At this time, a first example embodiment assumes that measurements for an unnecessary IRAT handover are configured.

Figure 6:
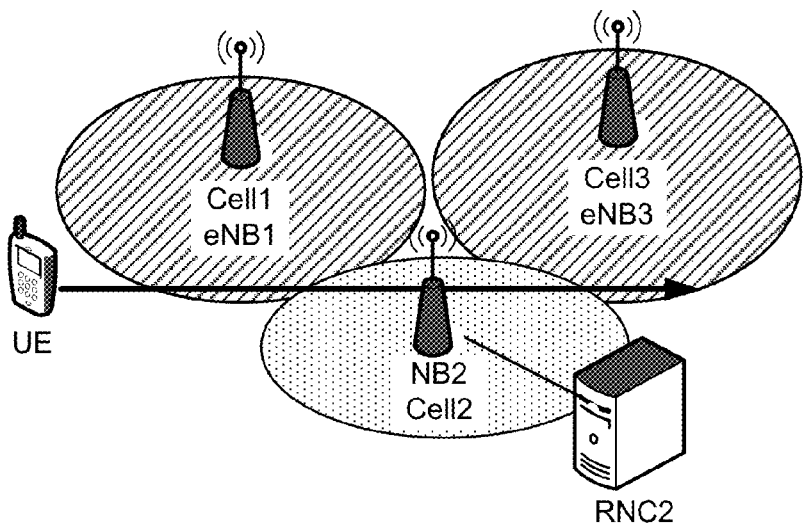
FIG. 6 shows an example of ping pong handover of a UE connection from a LTE network to a UTRAN network and back to the LTE network.

Taking FIG. 6 as an example scenario, if the UE connection, after being handed over from LTE Cell1 to UTRAN Cell2, is then handed over to LTE Cell 3 before the Measurement Duration timer window configured in the IRAT Measurement Configuration IE has expired and before the $T_{IRATPingPong}$ timer window has expired, then a HO Report is sent from RNC2 to eNB1.

Figure 9:
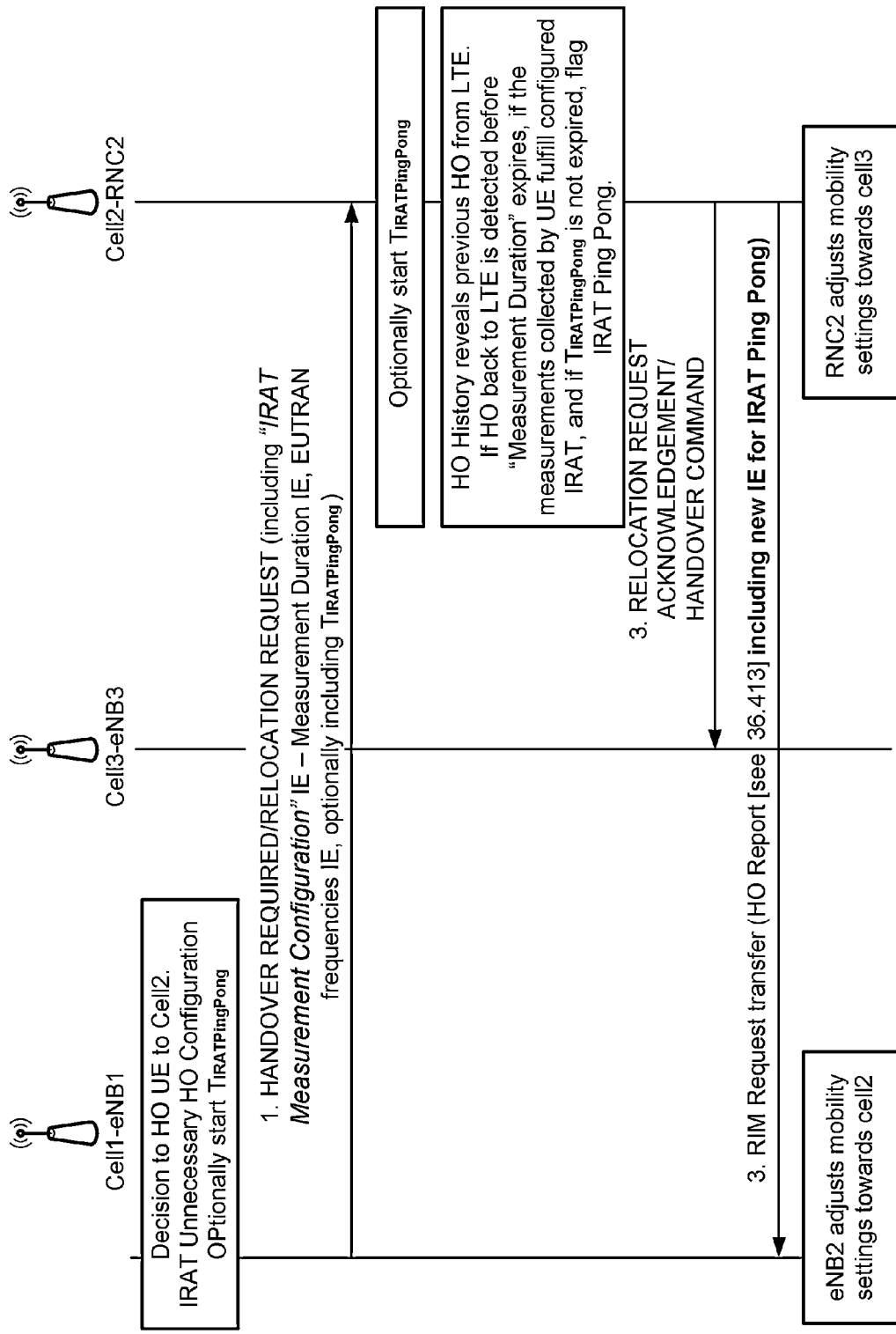
FIG. 9 illustrates an example message sequence for IRAT ping pong detection in accordance with a first non-limiting example embodiment.

FIG. 9 below shows a non-limiting example of a detailed message exchange between the nodes in the non-limiting example described in FIG. 6 for this first non-limiting example embodiment. In FIG. 9, the LTE eNB1 decides to handover the UE connection to UTRAN/GERAN Cell2. The LTE eNB1 can optionally decide to start the handover ping pong detection time window $T_{IRATPingPong}$. The handover signaling towards the UTRAN/GERAN RNC2 shown in step 1 contains the IRAT Measurement Configuration IE. Once the Relocation Request message (as part of Handover signaling) is received, the RNC2 may optionally decide to start $T_{IRATPingPong}$.

The decision to configure and start timer $T_{IRATPingPong}$, and to trigger and evaluate IRAT measurements, i.e., the decision to detect IRAT ping-pong handovers (independently of whether IRAT ping-pong handover detection is performed in the target RAT or the source RAT) may be taken at every IRAT handover instance, during a given time period, or that decision may be based on a pre-configured ratio of UE connections that are handed back to the source RAT within a preconfigured time after handover to the target RAT measured in the source RAT. Hence, until the $T_{IRATPingPong}$ timer is triggered and IRAT ping pong detection is activated, it is only known that UE connections are being handed back to the source RAT within a certain time period, but it is not possible to know whether the handover back to the source RAT was due to a coverage hole or due to a ping-pong handover.

The Source-to-Target Transparent Container received by the target RAT node (e.g., RNC2) in the RELOCATION REQUEST message may also contain the $T_{IRATPingPong}$ parameter. Doing so ensures that the source RAT (e.g., LTE) and target RAT (e.g., UTRAN/GERAN) are coordinated in evaluating when a handover ping pong event is to be triggered.

The RNC2 also configures the UE to perform measurements using an IRAT Measurement Configuration IE. From the handover signalling from the LTE eNB1, the UTRAN/GERAN RNC2 can understand that the UE is coming from an LTE RAT.

During the time when the UE connection is handled by Cell2, if a handover of that UE connection to LTE occurs from any of the cells served by the UTRAN/GERAN RNC2 before the $T_{IRATPingPong}$ expires, then, if the measurements collected by the UE fulfill the configured IRAT ping pong threshold(s) specified in the Measurement Configuration IE, the RNC2 generates a RIM transfer to the LTE eNB1 including an HO Report with the information collected until the handover from Cell2 to Cell3 was executed or until the Measurement Duration timer expired.

In one example embodiment, the UE in UTRAN may be configured to take IRAT measurements on LTE cells even when the IRAT Measurement Configuration IE is not present in the Source to Target Transparent Container IE. In this case, the target RAT (RNC2) configures the UE and includes the measurement results in an HO Report IE int eh RIM request transfer message, where the Measurement Duration and thresholds can be configured by the target RAT (RNC2). If the UE measurements fulfill the IRAT ping pong configured thresholds, then the HO Report IE can be sent back to the source RAT (eNB1) via a RIM Request message.

One example way to interpret reception of such HO Report is for the LTE eNB1 to deduce that the HO Report (not including any new IEs) was sent to indicate that an IRAT Ping Pong event of the LTE-UTRAN-LTE type. This is possible because eNB1 receives the HO Report before the Measurement Duration expires and/or before $T_{IRATPingPong}$ expires. For another example approach, the HO Report may contain a new information element (IE) that explicitly flags or indicates the occurrence of an IRAT Ping Pong of the LTE-UTRAN-LTE type. The new IE can be named "IRAT Ping Pong" as one example, and it can be a Boolean variable.

Once the IRAT Ping Pong event is flagged to the LTE eNB1, which analyzes the information contained in the HO Report, the LTE eNB1 can deduce the target cell for which the ping pong occurred, i.e., UTRAN Cell2 in this example. The LTE eNB1 can thus adjust its mobility parameter setting(s) towards that target cell in order to avoid future IRAT ping pong occurrences. Mobility parameters may include parameters that are used to configure UE measurements and report triggering. Once the IRAT ping pong handover is detected, the target RAT (RNC2) may also apply corrections to the mobility parameters towards the LTE target cell to avoid triggering such IRAT ping-pong handovers.

To adjust the mobility parameters that cause IRAT ping-pong handovers, the source LTE eNB1 may store a radio resource control (RRC) UE context from which it can determine the reasons for the IRAT handover. If the handover was not due to, for example coverage, then the information about the ping pong may be separated from handovers related to coverage in this example. A non-coverage example is handovers due to load balancing between radio access technologies. So one example way of handling this information is to consider IRAT handover ping pong information when evaluating load balancing but not when the reason for handover is coverage for the UE connection.

Another example is where the UE is moved from LTE to a lower frequency target RAT (e.g., UTRAN) because of the UE moving at high speed and in order to improve signal robustness. Once in the target RAT, the UE might be handed over back to LTE either because of a change in the UE speed or because of an error in configuration of handover parameters. By retrieving the UE context, the source eNB (e.g., eNB1) can determine what the handover cause was and can react appropriately, e.g., the source eNB can adjust hysteresis parameters when handing over a high speed UE to a lower frequency RAT. Also, the target RAT (e.g., UTRAN RNC2) can apply measures to avoid handover back to source RAT. One example way to do this is to only adjust the mobility parameters for UE handover to LTE that happened shortly after a handover from LTE occurred.

Moreover, the operations and maintenance (OaM) system may configure $T_{IRATPingPong}$, e.g., based on one or more predetermined factors such as the time needed for adequate measurements, the UE context perseverance time on the LTE source side, the cost of lost packets in the transport network, etc. Such configuration may be also performed and adjusted by the operator or defined a priori. Furthermore, the eNB and/or the RNC may store statistics about the ping pong events and non-ping pong events, and if desired, aggregate them into one or more reports and provide the report(s) to the OaM system. The aggregation may be implemented using for example counters and histograms.

Figure 10:
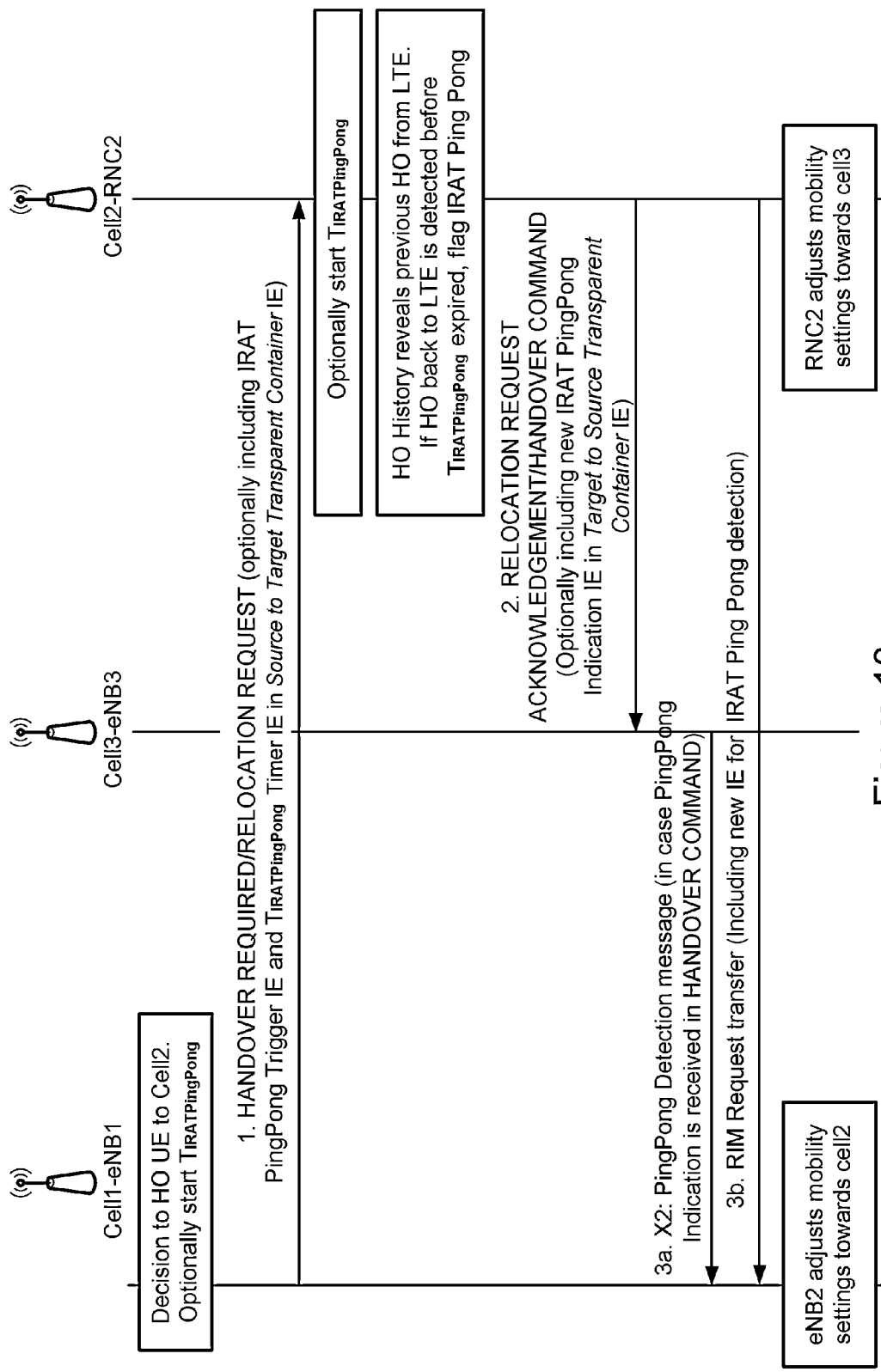
FIG. 10 illustrates an example message sequence for IRAT ping pong detection in accordance with a second non-limiting example embodiment.

In a second non-limiting example embodiment shown in FIG. 10, the source RAT (e.g., LTE eNB1) does not rely on IRAT Unnecessary Handover detection to detect an IRAT Ping Pong event. Instead, the source RAT includes one or more new IEs in a Source to Target Transparent Container sent via S1: HANDOVER REQUIRED. Such one or more new IEs may include a Ping Pong Detection trigger and/or an IRAT Ping Pong Timer (Step 1). The configuration of these IEs may have been obtained from an OaM node. The target RAT node (e.g., RNC2) may decide to configure the UE with measurements on cells in the source RAT, or the target RAT node may base the ping pong evaluation on handover occurrence, i.e., on whether the UE hands over back to the source RAT within the $T_{IRATPingPong}$ timer.

By knowing that the first handover was from LTE, the RNC2 can detect IRAT ping pong if a handover towards LTE occurs from any of the RNC2's served UTRAN/GERAN cells before $T_{IRATPingPong}$ expires. In this case, two options are now described. First, either at a ping pong event occurrence or after a number of ping pong events is detected (possibly within a preset time window), the RNC2 sends an IRAT ping pong indication to LTE eNB3 via a Target to Source Transparent Container in step 2. Message 3a follows which includes a new X2 message for indicating an IRAT ping pong. As a second option, either at a ping pong event occurrence or after a number of ping pong events is detected (possibly within a preset time window), the RNC2 sends a RELOCATION REQUEST ACKNOWLEDGEMENT to the core network (CN). Further, the RNC2 sends an IRAT ping pong indication to the LTE eNB1 via a dedicated RIM Request Transfer message as shown at message 3b.

Example actions and signaling that may be taken by eNB1, RNC2, and eNB3 to avoid future occurrence of the IRAT ping pong are similar to those described in the first example embodiment.

In a third non-limiting example embodiment, the source RAT (e.g., eNB1) does not include a new or specific IE in the Source to Target Transparent Container IE in the HANDOVER REQUIRED/RELOCATION REQUEST message. Instead, the target RAT (e.g., RNC2) autonomously decides to trigger a preconfigured $T_{IRATPingPong}$ timer. The target RAT (e.g., RNC2) can receive the timer $T_{IRATPingPong}$ from an OaM node. By knowing that the first handover was from LTE, the RNC2 can detect IRAT ping pong if a handover towards LTE from any of its served cells occurs before $T_{IRATPingPong}$ expires. The target RAT (RNC2) may decide to configure the UE with measurements on the source RAT (LTE), or it may base the ping pong evaluation on handover occurrence, i.e., on whether the UE hands over back to the source RAT within the $T_{IRATPingPong}$ timer. In this case, two options are now described. First, either at ping pong event occurrence or after a number of ping pong events is detected monitored (possibly within a preset time window), the RNC2 sends an IRAT ping pong indication to the eNB3 via a Target to Source Transparent Container in step 2. This is followed by message 3a which includes a new X2 message for indication of IRAT ping pong. For a second option, either at ping pong event occurrence or after a number of ping pong events is detected (possibly within a preset time window), the RNC2 sends a RELOCATION REQUEST ACKNOWLEDGEMENT to the core network (CN). Further, the RNC2 sends an IRAT ping pong indication to the eNB1 via a dedicated RIM message.

Example actions that may be taken by eNB1 and RNC2 to avoid future occurrence of the IRAT ping pong are similar to those described in the first example embodiment.

In another example embodiment, an operations and maintenance (OaM) node that communicates with at least the source RAT communications network, e.g., LTE, receives statistical information determined by one or more base stations and/or RNCs concerning IRAT handover ping pong events during an observation time. The IRAT handover ping pong event generation could be based on inter-node signaling as has been disclosed above. So for example, the eNB1, eNB3, and/or RNC gather such statistical data over the observation time period and send it to the OaM node. The OaM node determines an IRAT handover parameter reconfiguration based on the received statistical information and provides the determined IRAT handover parameter reconfiguration to avoid or reduce further IRAT ping pong handover of UE connections. Example OaM actions and signaling to avoid future occurrence of the IRAT ping pong are similar to those described in the example embodiments above for a radio network node.

Figure 11:
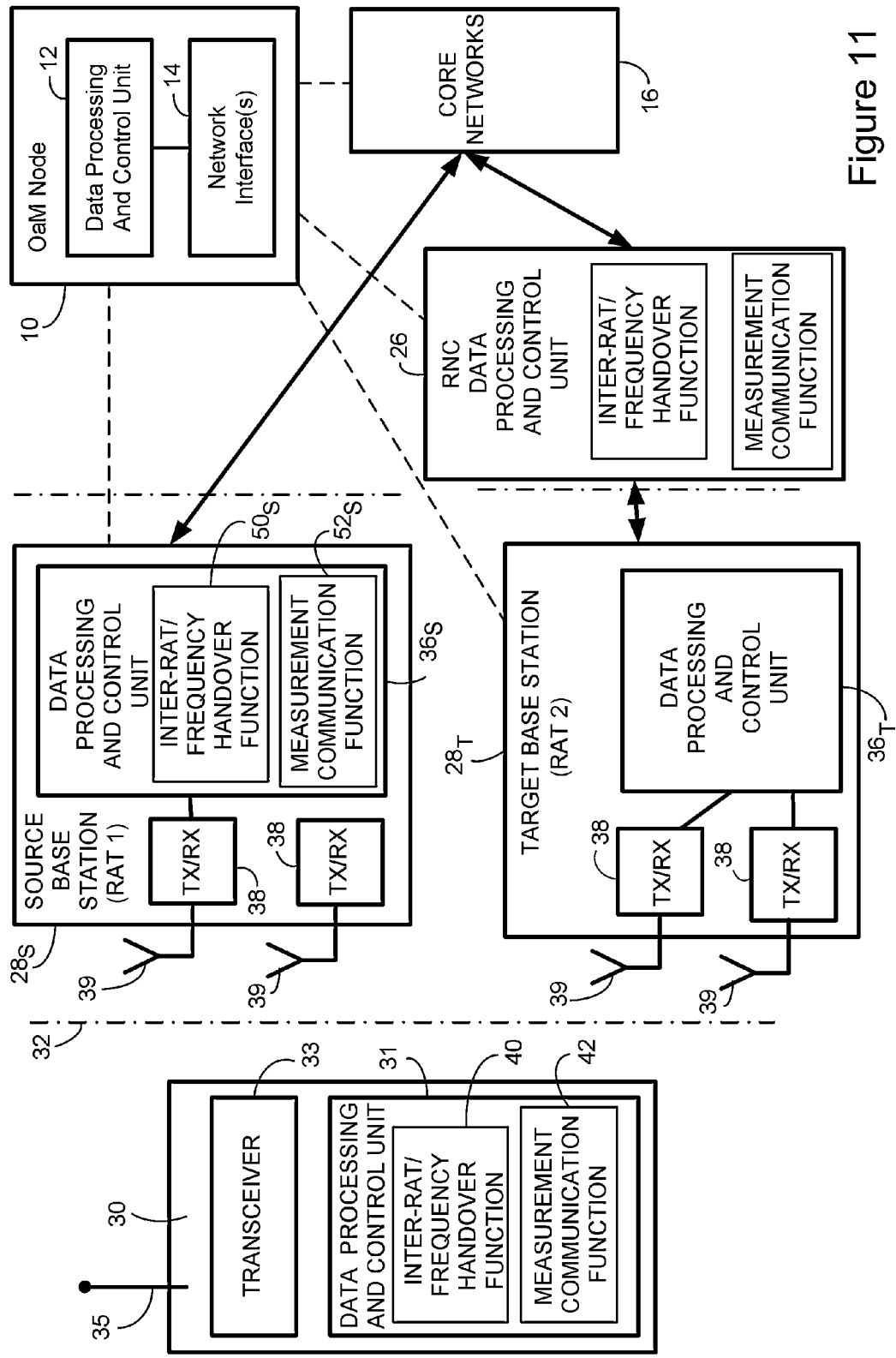
FIG. 11 illustrates function block diagrams of a UE, source base station, target base station, RNC, and core network nodes in accordance with one non-limiting example embodiment.

FIG. 11 shows a source base station $28_S$ with RAT 1 corresponding in this example to an LTE eNB and a target base station $28_T$ with RAT 2 corresponding in this example to a UTRAN NodeB. An operations and maintenance (OaM) node 10 is shown that includes a data processing and control unit 12 coupled to one or more network interfaces 14 for communicating with one or more core networks 16, RNC 26, and base stations 28. For example the OaM node 10 may receive statistical and/or performance information relating to IRAT handover ping pong from the RNC 26 and/or base stations 28 and may configure one or more IRAT handover ping pong parameters like $T_{IRATPingPong}$, e.g., based on one or more predetermined factors such as the time needed for adequate measurements, the UE context perseverance time on the LTE source side, the cost of lost packets in the transport network, etc.

FIG. 11 also shows general aspects of UE 30 and selected functionalities of the source base station $28_S$ and candidate base station $28_C$. The UE includes a data processing and control unit 31 for controlling various operations required by the UE. The data processing and control unit 31 includes a mobile terminal inter-RAT/frequency handover function 40 and measurement communication function 42. In addition, the data processing and control unit 31 provides control signals as well as data to an appropriate radio transceiver 33 connected to one or more antennas 35. There may be different transceivers for different RATs or a configurable transceiver configured to communicate with a current RAT. The measurement communication function 42 controls communications with source base station $28_S$ and target base station $28_T$ when requesting or obtaining measurements or information (e.g., measurements or information for potential handover purposes) are concerned. The inter-RAT/frequency handover function 40 is invoked when it is determined that a handover is to occur.

Both source base station $28_S$ and target base station $28_T$ comprise a base station data processing and control unit 36, which is connected to one or more base station radio transceivers (TX/RX) 38. Each base station transceiver (TX/RX) 38 is connected to a corresponding antenna 39, an appropriate one of which communicates over an air interface with the UE 30.

The data processing and control unit 36 of the source base station $28_S$ includes inter-RAT/frequency handover function 50 and measurement communication function 52. For example, source base station $28_S$ comprises inter-RAT/frequency handover function $50_S$ and measurement communication function $52_S$. Similar functionality is found in the radio network controller (RNC) 26 associated with the target bas station. The respective measurement communication function 52 controls communications with UE 30 for requesting or obtaining measurements or information (e.g., measurements or information for potential handover purposes); the respective inter-RAT/frequency handover function is invoked when it is determined that a handover is to occur.

The example embodiments described herein may be considered as independent embodiments or may be considered in any combination with each other to describe non-limiting examples.

The technology offers many benefits. For example, the technology makes it possible to avoid undesirable inter-RAT handovers in situations that known inter-RAT ping pong techniques have fallen short.

Although the description above contains many specifics, they should not be construed as limiting but as merely providing illustrations of some presently preferred embodiments. For example, non-limiting, example embodiments of the technology were described in a context with LTE and GERAN/UTRAN technologies. But the principles of the technology described may also be applied to other radio access technologies and other inter-RAT handover ping pong scenarios. Indeed, the technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the described technology for it to be encompassed by the descried technology.

The invention claimed is:

1. A method for detecting a possible inter-radio access technology (IRAT) ping pong handover of a user equipment (UE) connection between a source radio access technology (RAT) communications network and a different target RAT communications network, where in an IRAT ping pong handover, the UE connection is handed over from a first cell in the source RAT network to a second cell in the target RAT network and then handed over back to a third cell in the source RAT network within a predetermined limited time during which coverage for the UE connection is available from the source RAT network, the method being implemented by a control node associated with the target RAT network and comprising the steps of:
   determining, by the control node, IRAT ping pong handover information;
   evaluating the UE connection related to an IRAT handover request message from the source RAT network with respect to the IRAT ping pong handover information;
   based on the evaluating, determining that the UE connection meets one or more ping pong conditions associated with the IRAT ping pong handover information; and
   providing an indication of an IRAT ping pong handover condition to a base station in the source RAT network.

2. The method in claim 1, wherein the IRAT ping pong handover involves different base stations in the source RAT network, the method comprising the control node providing the indication of the IRAT ping pong handover condition to a handover source base station in the source RAT network.

3. The method in claim 1, wherein the determining step includes receiving the IRAT handover request message from the source base station in the source RAT network that includes IRAT measurement configuration information, UE handover measurement time period information, and IRAT handover time period information,
   wherein the determining step includes determining that the UE connection is to be handed back over to the source RAT network before the UE handover measurement time period has expired and before the IRAT handover time period has expired.

4. The method in claim 3, wherein the source RAT network is an LTE network, the target RAT communications network is a UTRAN network, the control node is a Radio Network Controller (RNC), wherein the method further comprises the RNC:
   receiving from the first cell a handover required relocation request message that includes the IRAT measurement configuration information, the UE handover measurement time period information, and the IRAT handover time period information, and
   sending a Radio Information Management (RIM) Request transfer message to the first cell that includes a handover report having a IRAT ping pong handover information element.

5. The method in claim 4, wherein the RNC sends the RIM message independently of whether an IRAT handover ping pong of the UE connection occurs.

6. The method in claim 4, wherein the RNC sends the handover report to a base station serving the first cell to allow that base station to adjust mobility or handover settings associated with the second cell and/or the target RAT network to avoid a future hand over of the UE connection to the second cell and/or the target RAT network.

7. The method in claim 4, wherein the handover report includes a HO Report Type information element (IE) or a HO type IE that includes an IRAT ping pong handover indicator.

8. The method in claim 3, wherein the control node adjusts handover or mobility parameters associated with the third cell and/or with the source RAT network, which are used to configure UE measurements and report triggering.

9. The method in claim 1, wherein the IRAT ping pong handover indication is sent from a base station serving the third cell to a base station serving the first cell.

10. The method in claim 1, wherein the IRAT ping pong handover involves different base stations in the source RAT network, the method comprising the control node providing the indication of the IRAT ping pong handover condition to a handover target base station in the source RAT network for subsequent delivery to a handover source base station in the source RAT network to allow the handover source base station to adjust mobility or handover settings associated with the second cell and/or the target RAT network to avoid a future hand over of the UE connection to the second cell.

11. The method in claim 1, wherein the source RAT network is an LTE network, the target RAT communications network is a UTRAN network, the control node is a Radio Network Controller (RNC), wherein the method further comprises the RNC:
   sending to the third cell a relocation request acknowledgement/handover message that includes the IRAT ping pong handover indication in a target to source transparent container information element (IE) to allow the third cell to provide the IRAT ping pong handover indication to the first cell.

12. The method in claim 1, wherein the source RAT network is an LTE network, the target RAT communications network is a UTRAN network, the control node is a Radio Network Controller (RNC), wherein the method further comprises the RNC receiving from a base station serving the first cell a handover required/relocation request message that includes an IRAT ping pong trigger information element (IE) and an IRAT ping pong timer IE in a source to target transparent container.

13. The method in claim 1, wherein the control node includes an IRAT ping pong timer, the method further comprising the control node:
   determining that the UE connection is handed over from the first cell in the source RAT network to the second cell in the target RAT network;
   determining an IRAT ping pong occurrence if a handover of the UE connection occurs to the source RAT network before the IRAT ping pong timer expires and coverage for the UE connection is available from the source RAT network.

14. The method in claim 13, wherein the source RAT network is an LTE network, the target RAT communications network is a UTRAN network, the control node is a Radio Network Controller (RNC), wherein the method further comprises the RNC sending an IRAT ping pong indication to the third cell via a target to source transparent container to allow a base station serving the third cell to send an IRAT ping pong indication message to the first cell.

15. The method in claim 13, wherein the source RAT network is an LTE network, the target RAT communications network is a UTRAN network, the control node is a Radio Network Controller (RNC), wherein the method further comprises the RNC sending a RELOCATION REQUEST ACKNOWLEDGEMENT message to a core network (CN) node and sending an IRAT ping pong indication to the first cell via a Radio Information Management (RIM) Request Transfer message.

16. The method in claim 1, wherein the control node receives an IRAT ping pong handover detection time window from an operations and maintenance node.

17. A control node for detecting a possible inter-radio access technology (IRAT) ping pong handover of a user equipment (UE) connection between a source radio access technology (RAT) communications network and a different target RAT communications network, where in an IRAT ping pong handover, the UE connection is handed over from a first cell in the source RAT network to a second cell in the target RAT network and then handed over back to a third cell in the source RAT network within a predetermined limited time during which coverage for the UE connection is available from the source RAT network, the control node being associated with the target RAT network and comprising data processing circuitry configured to:
 determine, by the control node, IRAT ping pong handover information;
 evaluate the UE connection related to an IRAT handover request message from the source RAT network with respect to the handover ping pong information;
 based on the evaluating, determine that the UE connection meets one or more ping pong conditions associated with the handover ping pong information; and
 provide an indication of an IRAT ping pong handover condition to a base station in the source RAT network.

18. The control node in claim 17, wherein the IRAT ping pong handover involves different base stations in the source RAT network and the control node is configured to provide the indication of the IRAT ping pong handover condition to a handover source base station in the source RAT network.

19. The control node in claim 17, wherein the control node is configured to:
 receive the IRAT handover request message from a source base station in the source RAT network that includes IRAT measurement configuration information, UE handover measurement time period information, and IRAT handover time period information, and
 determine that the UE connection is to be handed back over to the source RAT network before the UE handover measurement time period has expired and before the IRAT handover time period has expired.

20. The control node in claim 19, wherein the source RAT network is an LTE network, the target RAT communications network is a UTRAN network, the control node is a Radio Network Controller (RNC), wherein the RNC is configured to:
 receive from the first cell a handover required/relocation request message that includes the IRAT measurement configuration information, the UE handover measurement time period information, and the IRAT handover time period information, and
 send a Radio Information Management (RIM) Request transfer message to the first cell that includes a handover report having a IRAT ping pong handover information element.

21. The control node in claim 20, wherein the handover report includes a HO Report Type information element (IE) or a HO type IE that includes an IRAT ping pong handover indicator.

22. The control node in claim 19, wherein the control node is configured to adjust handover or mobility settings associated with the third cell and/or the source RAT network.

23. The control node in claim 17, wherein the source RAT network is an LTE network, the target RAT communications network is a UTRAN network, the control node is a Radio Network Controller (RNC), wherein the RNC is configured to send to the third cell a relocation request acknowledgement/handover message that includes an IRAT ping pong handover indication in a target to source transparent container information element (IE) to allow the third cell to provide the IRAT ping pong handover indication to the first cell.

24. The control node in claim 17, wherein the source RAT network is an LTE network, the target RAT communications network is a UTRAN network, the control node is a Radio Network Controller (RNC), wherein the RNC is configured to receive from a base station serving the first cell a handover required/relocation request message that includes an IRAT ping pong trigger information element (IE) and an IRAT ping pong timer IE in a source to target transparent container.

25. The control node in claim 17, wherein the control node includes an IRAT ping pong timer, the control node configured to:
 determine that the UE connection is handed over from the first cell in the source RAT network to the second cell in the target RAT network;
 determine an IRAT ping pong occurrence if a handover of the UE connection occurs to the source RAT network before the IRAT ping pong timer expires.

26. The control node in claim 25, wherein the source RAT network is an LTE network, the target RAT communications network is a UTRAN network, the control node is a Radio Network Controller (RNC), wherein the RNC is configured to send an IRAT ping pong indication to the third cell via a target to source transparent container to allow a base station serving the third cell to send an IRAT ping pong indication message to the first cell.

27. The control node in claim 25, wherein the source RAT network is an LTE network, the target RAT communications network is a UTRAN network, the control node is a Radio Network Controller (RNC), wherein the RNC is configured to send a RELOCATION REQUEST ACKNOWLEDGEMENT message to a core network (CN) node and sending an IRAT ping pong indication to the first cell via a Radio Information Management (RIM) Request Transfer message.

28. A method associated with detecting a possible inter-radio access technology (IRAT) ping pong handover of a user equipment (UE) connection between a source radio access technology (RAT) communications network and a different target RAT communications network, where in an IRAT ping pong handover, the UE connection is handed over from a first cell in the source RAT network to a second cell in the target RAT network and then handed over back to a third cell in the source RAT network within a predetermined limited time during which coverage for the UE connection is available from the source RAT network, the method being implemented by a base station associated with the first cell in the source RAT network and comprising the steps of:
 sending, by the base station, a handover or cell relocation request message to a control node associated with the target RAT communications network;

receiving an indication of an IRAT ping pong handover condition if the UE connection meets one or more ping pong conditions associated with the handover ping pong information; and adjusting mobility parameters with respect to the second cell and/or to the target RAT network to avoid a future handover of the UE connection to the second cell.

29. The method in claim 28, wherein the source RAT network is an LTE network, the target RAT communications network is a UTRAN network, the control node is a Radio Network Controller (RNC), wherein the handover or cell relocation request message includes IRAT measurement configuration information and UE handover measurement time period information, and wherein the base station receives a Radio Information Management (RIM) Request transfer message that includes a handover report having an IRAT ping pong handover information element.

30. The method in claim 29, wherein the handover or cell relocation request message includes IRAT handover time period information.

31. The method in claim 28, wherein the base station receives an IRAT ping pong handover indication from a base station serving the third cell.

32. The method in claim 28, further comprising determining statistical information concerning IRAT ping pong handover over an observation time period and sending the determined statistical information to an operations and maintenance node.

33. A source radio access technology (RAT) base station for use in detecting a possible inter-radio access technology (IRAT) ping pong handover of a user equipment (UE) connection between a source radio access technology (RAT) communications network and a different target RAT communications network, where in an IRAT ping pong handover, the UE connection is handed over from a first cell in the source RAT network and served by the source RAT base station to a second cell in the target RAT network and then handed over back to a third cell in the source RAT network within a predetermined limited time during which coverage for the UE connection is available from the source RAT network, the source RAT base station comprising:

a transmitter configured to send a handover or cell relocation request message to a control node associated with the target RAT communications network;

a receiver configured to receive an indication of an IRAT ping pong handover condition if the UE connection meets one or more ping pong conditions associated with the handover ping pong information; and processing circuitry configured to adjust mobility parameters with respect to the second cell and/or to the target RAT network to avoid a future handover of the UE connection to the second cell.

34. The source RAT base station in claim 33, wherein the source RAT network is an LTE network, the target RAT communications network is a UTRAN network, the control node is a Radio Network Controller (RNC), wherein the handover or cell relocation request message includes IRAT measurement configuration information and UE handover measurement time period information, and wherein the base station receives a Radio Information Management (RIM) Request transfer message that includes a handover report having an IRAT ping pong handover information element.

35. The source RAT base station in claim 33, wherein the base station receives an IRAT ping pong handover indication from a base station serving the third cell.

36. The source RAT base station in claim 33, wherein the first and third cells are the same cell.

37. An operations and maintenance node configured to communicate with a source radio access technology (RAT) communications network and a different target RAT communications network, comprising data processing circuitry configured to:

receive statistical information determined by one or more control nodes concerning IRAT handover ping pong events during an observation time period;

determine an IRAT handover ping pong detection time window based on the received statistical information;

provide the determined IRAT handover ping pong detection time window to enable a network control node to detect an IRAT handover ping pong situation for a user equipment (UE) connection and take action to avoid further IRAT ping pong handover of the UE connection, where in an IRAT ping pong handover, the UE connection is handed over from a first cell in the source RAT network to a second cell in the target RAT network and then handed over back to a third cell in the source RAT network within a predetermined limited time.

* * * * *

UNITED STATES PATENT AND TRADEMARK OFFICE
CERTIFICATE OF CORRECTION

PATENT NO. : 9,503,944 B2
APPLICATION NO. : 14/691737
DATED : November 22, 2016
INVENTOR(S) : Centonza et al.

It is certified that error appears in the above-identified patent and that said Letters Patent is hereby corrected as shown below:

On the Title Page

In Item (72), under "Inventors", in Column 1, Line 2, delete "Linkoping" and insert -- Linköping --, therefor.

In Item (72), under "Inventors", in Column 1, Line 3, delete "Linkoping" and insert -- Linköping --, therefor.

In the Drawings

In Fig. 1, Sheet 1 of 11, delete "OaM" and insert -- O&M --, therefor.

Figure 3:
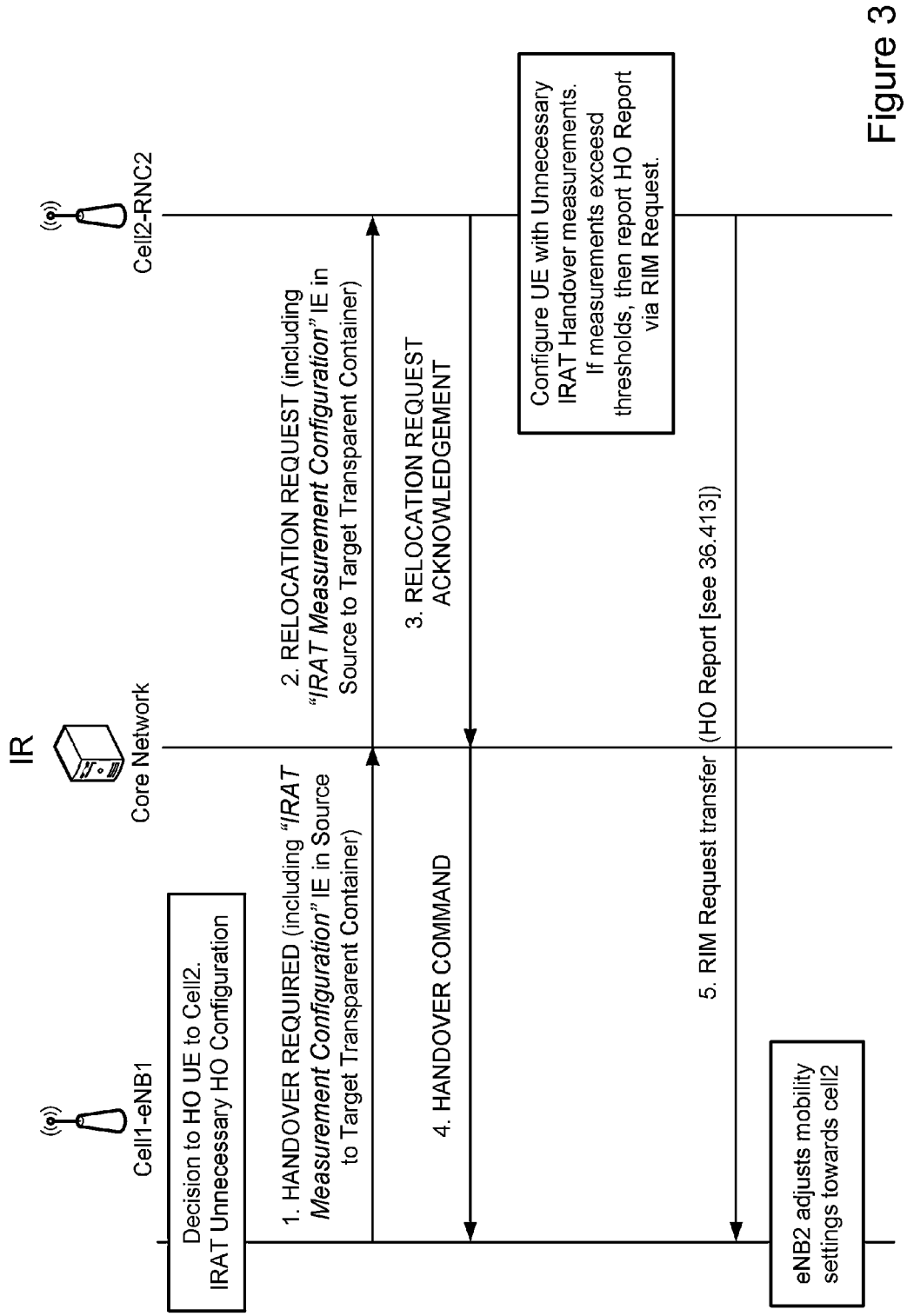
FIG. 3 illustrates an example signaling diagram for a 3GPP-based unnecessary handover detection procedure.

In Fig. 3, Sheet 3 of 11, delete "exceesd" and insert -- exceed --, therefor.

In Fig. 9, Sheet 9 of 11, delete "OPtionally" and insert -- Optionally --, therefor.

In Fig. 11, Sheet 11 of 11, for Tag "10", Line 1, delete "OaM" and insert -- O&M --, therefor.

In the Specification

In Column 1, Line 9, delete "2013," and insert -- 2013, now Pat. No. 9,042,895, --, therefor.

In Column 3, Line 38, delete "eNB3)." and insert -- eNB3. --, therefor.

In Column 4, Line 35, delete "reloation" and insert -- relocation --, therefor.

In Column 7, Line 1, delete "DESCRIPTION" and insert -- DETAILED DESCRIPTION --, therefor.

Signed and Sealed this
Twenty-first Day of March, 2017

Michelle K. Lee
*Director of the United States Patent and Trademark Office*

CERTIFICATE OF CORRECTION (continued)
U.S. Pat. No. 9,503,944 B2

In Column 9, Line 9, delete "(OaM)." and insert -- (O&M). --, therefor.

In Column 10, Line 49, delete "$T_{IRATPingpong}$ The handover" and insert -- $T_{IRATPingpong}$. The handover --, therefor.

In Column 12, Line 24, delete "(OaM)" and insert -- (O&M) --, therefor.

In Column 12, Line 35, delete "OaM" and insert -- O&M --, therefor.

In Column 12, Line 45, delete "OaM" and insert -- O&M --, therefor.

In Column 13, Line 12, delete "OaM" and insert -- O&M --, therefor

In Column 13, Line 38, delete "(OaM)" and insert -- (O&M) --, therefor.

In Column 13, Line 46, delete "OaM" and insert -- O&M --, therefor.

In Column 13, Line 47, delete "OaM" and insert -- O&M --, therefor.

In Column 13, Line 51, delete "OaM" and insert -- O&M --, therefor.

In Column 13, Line 58, delete "(OaM)" and insert -- (O&M) --, therefor.

In Column 13, Line 62, delete "OaM" and insert -- O&M --, therefor.

In Column 14, Line 37, delete "bas station." and insert -- base station. --, therefor.

In the Claims

In Column 15, Line 52, in Claim 4, delete "required relocation" and insert -- required/relocation --, therefor.